M. J. WEBER.
COIN CONTROLLED WEIGHING SCALE.
APPLICATION FILED DEC. 15, 1916.

1,252,752.

Patented Jan. 8, 1918.
4 SHEETS—SHEET 1.

FIG. 1.

WITNESSES:

INVENTOR:
MATHIAS J. WEBER.
BY
ATTORNEYS.

UNITED STATES PATENT OFFICE.

MATHIAS J. WEBER, OF CHICAGO, ILLINOIS.

COIN-CONTROLLED WEIGHING-SCALE.

1,252,752.　　　　　　Specification of Letters Patent.　　　Patented Jan. 8, 1918.

Application filed December 15, 1916. Serial No. 137,143.

*To all whom it may concern:*

Be it known that I, MATHIAS J. WEBER, a citizen of the United States, and a resident of the city of Chicago, in the county of Cook and State of Illinois, have invented a certain new and useful Improvement in Coin-Controlled Weighing-Scales; and I do hereby declare that the following description of my said invention, taken in connection with the accompanying sheets of drawing, forms a full, clear, and exact specification, which will enable others skilled in the art to which it appertains to make and use the same.

My invention relates generally to improvements in coin controlled weighing scales, and it consists, essentially, in the novel and peculiar combination of parts and details of construction, as hereinafter first fully set forth and described and then pointed out in the claims.

The object of my present invention is the production of a coin-controlled weighing machine, especially designed for the weighing of humans, which cannot be manipulated so that several persons may take their weight by depositing but one coin, which can now be done on every coin controlled weighing scale with which I am acquainted, by one person stepping onto the scale platform before the first person has completely stepped off the same, and thus continue to do so with a number of persons. It is well known that thus "beating" the scales results in a loss to the owner or lessee of the scales amounting to quite a sum, which has been variously estimated at from 25 to 50 per cent.

To accomplish this result, I construct this scale as shown in the preferred embodiment of my invention in the before-mentioned drawings, in which.

A, in these drawings designates the base of the weighing scale, and B, the platform thereon, these parts being of the usual and well-known construction, and, therefore, require no detailed description nor illustration, it being understood that my invention is applicable to nearly all, if not all, of the existing scales of the type set forth.

C, is the column, and D, the head of the scale mounted on, or formed integrally with, said column, which latter member is a hollow or tubular structure through which the connecting rod 12, which connects the usual levers in the scale platform to the weighing beam E, located in the head D, passes. As heretofore constructed, the fulcrum of this beam E is fixed, but in my construction I make this fulcrum vertically movable by placing the bearing for this fulcrum 13, in a forked slide 14, embracing the beam E, which slide 14 moves on pins 15, 16, in a slotted aperture 17. This sliding fulcrum bearing 14 rests upon the short arm 19, of a cranked lever F, which lever is pivoted at 18, there being connected to the long arm 20, of said cranked lever F, a spring 21, which spring tends to sustain the fulcrum slide 14 in elevated position. The weighing beam E connects, by a rod 12 to the levers in the platform, and when a person steps upon this platform and depresses the same by his weight, the weighing beam E descends accordingly, its downward movement being limited by a stop 22.

To the long arm 20 of the cranked lever F is pivotally connected a rod 23, that engages said long arm 20 at one end by a bolt 25, and an oscillating lever G, at the arm 26 thereof, by a bolt 25ᵃ. This oscillating lever swings on a pivot 24, and at the end 27 of said lever G there is pivoted, by a bolt 28, a connecting rod 29, which rod 29 engages a segmental ratchet 30, which ratchet is rotatably mounted on a stud 31. Constructed to be operated by said ratchet 30, there is, pivoted on a stud 32, a depending ratchet-engaging arm 33, to which further reference will be hereinafter had.

Pivoted on a stud 34, there is rotatably mounted a bell crank lever H, the short arm 36 of which is bifurcated at 35, while the long arm of said lever H, viz., 37, is provided with a pull or handle 38, usual in slot machines, coin controlled weighing machines, and other analogous machines.

Figures 3, 4:
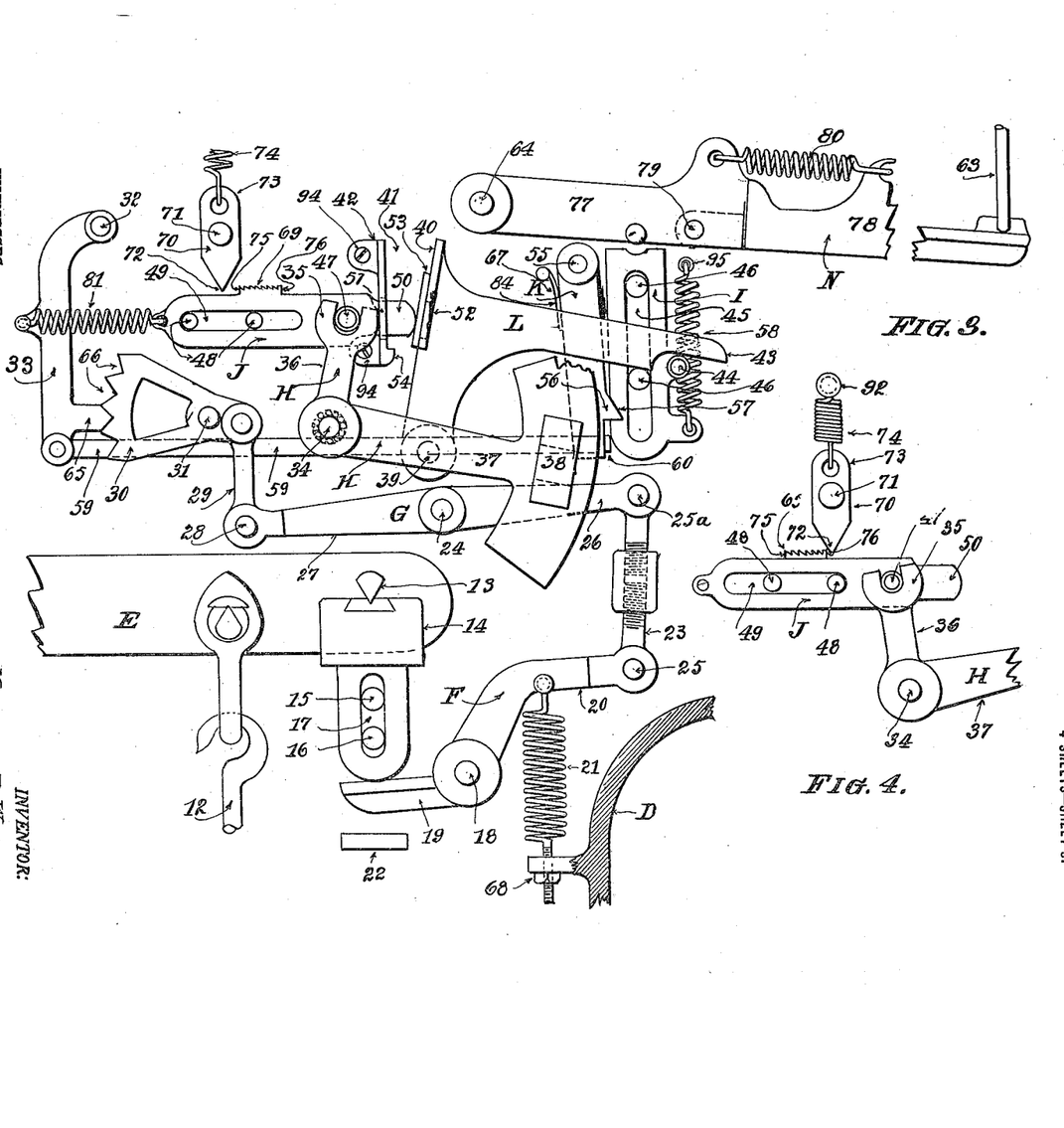
Fig. 3 is a similar view on an increased scale, illustrating the coin controlled mechanism in a position in which the graduated weighing beams are unlocked, ready for a person standing on the scale platform, to take his weight.
Fig. 4 is a detail view of the push bar and the means for preventing retrograde movement thereof until moved to its limit of forward movement.
Figure 5:
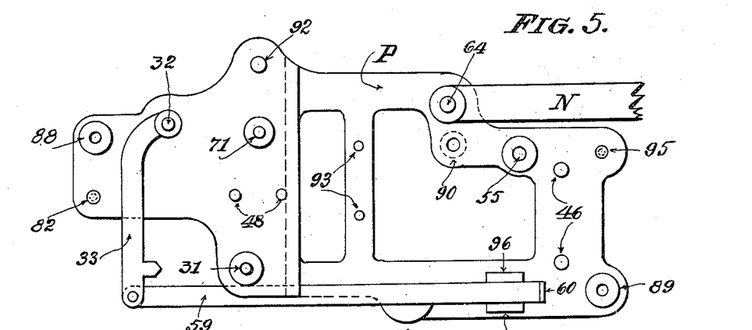
Fig. 5 is a plan of the back plate of the frame on which part of the mechanism for locking and unlocking the graduated scale beams is mounted, and also showing part of the mechanism for releasing the locking mechanism.
Figures 6, 7:
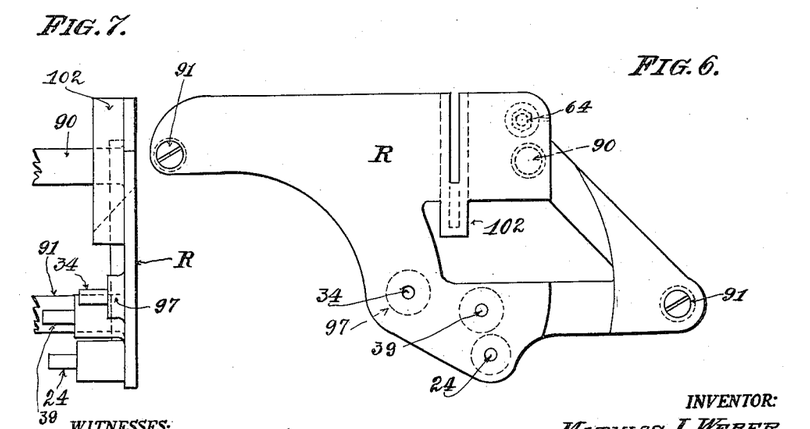
Fig. 6 is a plan of the front plate of said frame.
Fig. 7 is an end elevation of the same.

Pivoted on a stud 39, there is rotatably mounted an L-shaped member L, which I shall hereinafter designate the oscillator, said member L having at one extremity a plate 40, which serves as one wall for a coin chute 41, the other wall, 42, of said chute being suitably fixed to a properly constructed plate or frame hereinafter to be described. The other extremity of said oscillator L is, preferably, reduced in width, as shown at 43, and this end of the oscillator bears upon a stud 44, projecting from a locking slide I, which slide has a slot hole 45, engaging two studs 46, to guide said locking slide in its vertical movement. This vertical movement of the locking slide I is accomplished in the following manner:

Engaging the bifurcated end 35 of the bell crank lever H, by a stud 47, there is mounted in the frame structure a horizontally movable element, which I term the push bar. This push bar J, moves upon studs 48, operating in a slot hole 49, in said push bar, and the forward, reduced portion 50 thereof enters a slot hole 51, in the fixed member 42 of the coin chute, and when the bell crank lever H is operated by manipulating the pull 38, this reduced portion 50 enters a slot hole 52 in the plate 40, but leaves the oscillator unmoved. If, however, a coin 53, is dropped into the coin chute when the parts already described are in their normal position, said coin, resting on a projection 54, on the fixed member 42, and the bell crank lever H is then operated by pulling the pull 38 downwardly, the reduced portion 50 of the push bar bearing upon the coin 53, will push the member 40 of the oscillator L away from the fixed wall 42, rotating it on its pivot 39, and the arm of the oscillator having the reduced portion 43, will then push the locking slide I downwardly, and when this slide I reaches its lowermost position, it is locked in that position by the following mechanism:

At one side of the locking slide I there is pivoted, upon a stud 55, a depending bar or dog K, which dog has a projection or nose 56, constructed to enter a correspondingly shaped notch 57, in the locking slide I, and thereby keep the locking slide I in depressed position, a spring 67, Fig. 3, acting upon the depending dog K, keeping the latter in engagement with the locking slide I. When this dog K releases the locking slide I, the latter is returned to its normal position by a tensioned spring 58. The mechanism for releasing this locking slide I comprises a release bar 59, pivoted at one end to the lower extremity of the depending arm 33, and having its other end provided with a hook 60, which reaches behind the lower extremity of the depending dog K; said release bar 59 being properly guided in any approved manner, such as guiding lugs 96, shown best in Figs. 5 and 6. This releasing of the locking slide I is accomplished by rotating the segmental ratchet 30, as will hereinafter appear.

Figure 1:
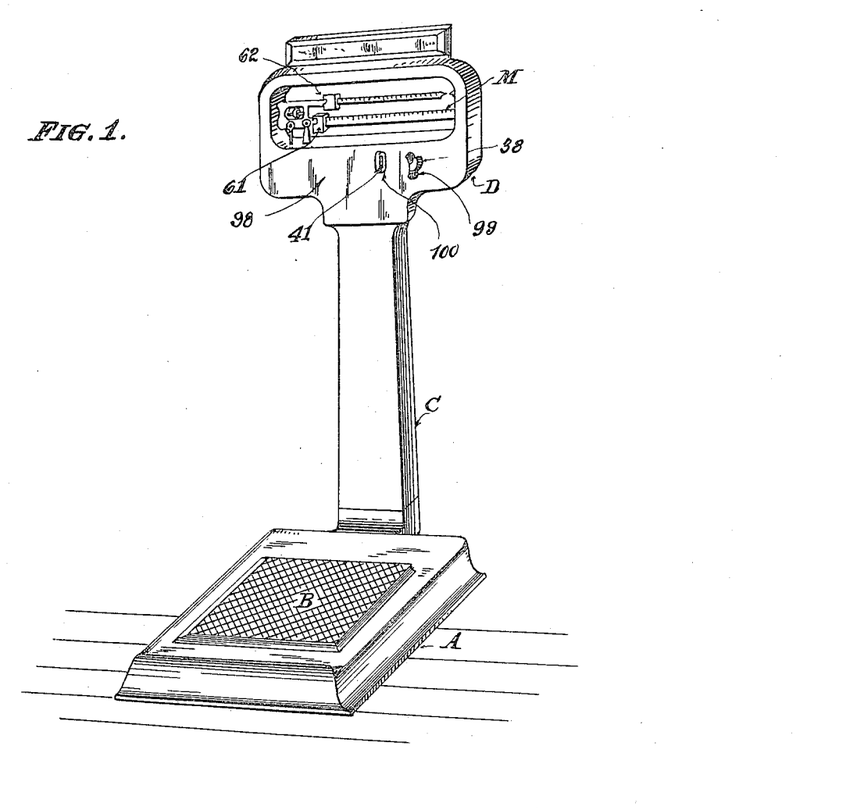
Figure 1 is a perspective view of a weighing scale embodying my improvements.
Figure 2:
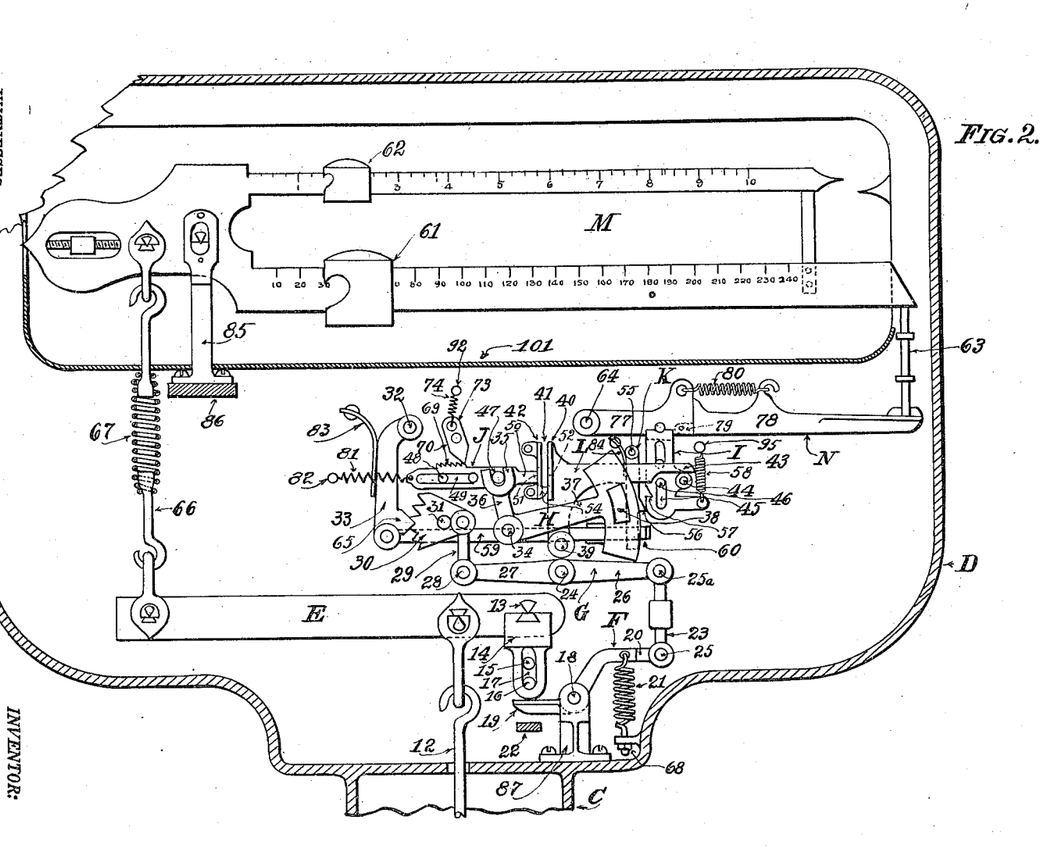
Fig. 2 is an elevation of the head thereof, the front of the same being removed to disclose the internal mechanism.

I have already stated that the graduated scale beam mechanism M, Figs. 1 and 2, is of the usual construction, and in the weighing scales under consideration, a person stepping on the platform B, cannot take his weight by sliding the weights 61, 62, because the scale beam mechanism is locked in raised position by a rod 63, supported by a supporting arm N, which arm is pivoted upon a stud 64, and is held in raised position by the locking slide I.

I shall now proceed to describe the operation of the mechanism which unlocks the graduated scale beam mechanism M.

A person stepping on the platform B, his weight causes a depression or downward movement of the platform, and thereby a pulling down of the weighing beam E. This movement is transmitted through the fulcrum 13 thereon, to the slide 14, and by it, and lever F, rod 23, oscillating lever G, connecting rod 29, to the segmental ratchet 30, rotating the same in an upward direction. On the depending arm 33, there is a V-shaped nose 65, which, when all the parts are in normal position engages one of the notches 66 of the segmental ratchet 30. When this ratchet rotates, the nose 65 is pushed out of engagement with the notch 66 and thereby moving the depending arm 33, pulls the rod 59 toward the left until it touches the end of the dog K, without interfering with the locking slide I, which, however, is still held up by its tensioned spring 58. If the person on the scale platform now drops a coin into the coin slot and then pulls the pull 38 on the bell crank lever H, the oscillator L will be moved, and this movement will depress the locking slide I, and thereby liberate the supporting arm N, and the graduated scale beams M, holding, however, the locking slide I in depressed position by the depending dog K, engaging, with the nose 56, the notch 57 in the slide I.

When the person on the platform releases the pull 38, which will return the bell crank lever H to normal position, the push bar J releases the coin 53, which then drops down through a suitable chute, not shown, into a coin receptacle located in the column C, not shown. The person on the scale platform may now ascertain his weight by moving the weights 61, 62, and when he then steps off the platform, the weighing beam E will move upwardly, and through the movements of the intermediate elements, again rotate the segmental ratchet 30, pushing the depending arm 33 from it, pull the depending dog K out of engagement with the locking slide I permitting the latter to return to normal position and thereby to raise and again lock the graduated scale beams M in elevated position.

In all coin controlled weighing scales with which I am acquainted, it is possible for several persons to take their weight by the deposition of a single coin, by one person holding down the platform until the next person has stepped onto the same. Thus operating the weighing scales to defraud, is not possible in my improved weighing scales, for the reason that the spring 21 which supports the weighing beam E is tensioned so as to sustain the maximum weight that may be placed on the scales, which, in the scales under consideration is 250 lbs., and which weight will depress the slide 14 to its limit and also rotate the segmental ratchet 30 to its limit of rotation. It follows that a lesser weight than the full weight of the person on the scale platform causes a corresponding upward movement of this slide 14, and its co-ordinated parts, so that if said person steps off the platform with one foot only, this reduction in the weight on the platform is sufficient to rock the depending arm 33, release the locking slide I which will move upwardly by the action of the spring 58, and thus lock the supporting arm N, and with it the graduated scale beams M. This movement of the parts is a very sensitive one, a reduction of a few pounds of weight on the scale platform being sufficient to cause the rotation of the segmental ratchet 30, and thereby to lock the supporting arm. It, furthermore, follows that after the graduated scale beams have been once locked, they cannot be unlocked without dropping a coin into the coin slot and manipulating the pull 38.

Moving the weighing beam E downwardly and thus acting on the spring 21 will affect the correct weighing by transferring part of the weight on the scale platform to said spring, and to compensate for this difference I place in the rod 66 that connects the weighing beam E to the graduated scale beams M a compensating coil spring 67, which is tensioned to correspond with the tension of the spring 21. A slight difference in these tensions can be readily adjusted by changing the weight of the weights 61, 62, or by making the graduations on the scale beams accordingly, or by adjusting the tension of the spring 21 by its adjusting nut 68.

When a person on the scale platform starts to pull the pull 38 downwardly, he has to continue the downward movement to the limit of said movement, otherwise the locking slide I will not release the supporting bar N. To prevent return of the pull 38 before it has reached its downward limit, I employ means, as follows:

On the push bar J there is formed a short rack 69, one face of the teeth thereon being substantially at right angles to the line of movement of said push bar J. A dog or click 70, pivotally mounted on a stud 71, has its lower portion contracted to a sharp edge 72, which reaches to nearly the upper edge of the push bar J. This click has an extension 73, to which a tensioned spring 74 is connected. Normally, as shown in Figs. 3 and 4, this click 70 stands vertically, its point 72 being just in front of said rack 69. The push bar J being moved by the bell crank lever H to the right in Fig. 2, the click will, by moving on its pivot, turn to the right and slide over these teeth until the push bar has reached its limit of forward movement and the rack 69 has passed the lower end of the click when the spring 74 will again pull the click into vertical position shown in Fig. 3. Should, however, a person on the scale platform attempt to return the pull 38 to normal position before said pull has reached its limit of downward movement, the click 70, occupying the position shown in Fig. 2, will resist any return movement of the push bar J until it has completed its forward movement and has, thereby, liberated the click and permitted it to again assume its vertical position. The push bar J, in returning, rotates the click 70 on its pivot to a position opposite to that shown in Fig. 2, the end shoulder 75 on the rack 69 accomplishing this movement so that the click will slide over the teeth on the rack until the right hand end 76, of the rack has passed the sharp end of the click, when the latter will again assume its vertical position. When the push bar J is now again forwardly moved the shoulder 76 will move the click back to its inclined position shown in Fig. 2.

The supporting arm N, as shown, comprises two members or limbs, 77, 78, pivotally connected at 79, a spring 80 connecting these parts. This method of pivoting the forward part of the supporting-arm is designed to prevent possible injury to the scale mechanism should a person attempt to unlock the graduated scale beams by pushing down on the supporting arm, in cases where this arm is accessible. Wherever possible, I shall locate the coin controlled mechanism in the head so far below the opening therein as to make the supporting bar N inaccessible, and cover the space in the head by a plate 101, as illustrated in Fig. 2.

In the aforesaid case, the said bar N need not be made of two, hingedly connected parts 77, 78, but a single bar of sufficient length will suffice to attain the desired result.

I have heretofore described the mechanism that locks and unlocks the supporting bar as being operated by the downward movement of the weighing beam E, but I desire it to be understood that I do not wish to limit myself to this precise construction, being well aware that the rotation of the segmental ratchet 30 may be attained by other mechanical means without affecting the mechanism which is controlled by the coin in the coin slot.

In order to return the bell crank lever H and the push bar J automatically to normal position, after these parts have completed their forward movement should a person fail to do so by an upward movement of the pull 38, I attach to the pull bar J a spring 81, the other end of said spring 81 being connected to the depending arm 33, as shown in Fig. 3. By thus connecting this spring to the depending arm 33, I secure the double result of keeping the arm 33 always in contact with the ratchet 30, and pulling the push bar J to its normal position. Should I, however, find that by thus connecting this spring 81, I require too much power to move the depending arm by the segmental ratchet 30, I shall attach the spring 81 to a stud or pin 82, Fig. 2, and provide a light blade spring 83, or similar means for the depending arm 33. And similarly, I provide a blade, or other spring 84, to cause the engagement of the nose 56 on the depending dog K with the notch 57 in the locking slide I, whenever the parts I, K, are in position to permit of this engagement.

The graduated scale beams M are supported in a standard 85, secured to a cross bar 86, in the head D, while the cranked lever F is pivoted in a standard 87, as clearly shown in Fig. 2.

I have heretofore mentioned that a suitable frame is provided wherein the parts of the coin controlled mechanism are located. This frame comprises two members, viz., a plate P, and a plate R, shown detached in Figs. 5 and 6, the plate P being the back plate, and the plate R being the front plate. These plates are spaced apart by two bosses 88, 89, projecting from the back plate, and a boss 90, formed on the back of the front plate, screws 91 entering tapped holes in these bosses being provided to hold the two plates rigidly together.

On the back plate P, there are, furthermore, provided the projecting pins 48, on which the push bar J reciprocates, also the pivotal pin 32, on which the depending arm 33 rotates; a pin 92, to which the spring 74 for the click 70 is hitched; the pivot stud 31 for the segmental ratchet 30; the pivot stud 71 on which the click 70 rotates; the two tapped holes 93 for the reception of screws 94, Fig. 3, by which the fixed coin slot member is secured to said back plate; the pivot stud 64 for the locking arm N; the pivot stud 55 for the depending dog K; the two pins 46 on which the locking slide is guided, a stud 95, to which the upper end of the spring 58 is hitched, and two projecting lugs 96, between which the release bar 59 slides to keep the release bar in proper position.

On the back of the back plate R there are furthermore provided a boss 97, for the reception of the journal pin 34 on which the bell crank lever H is mounted, and the separating boss 90 already mentioned. It has also the pivot bolt 24 for the oscillating lever G.

Figure 8:
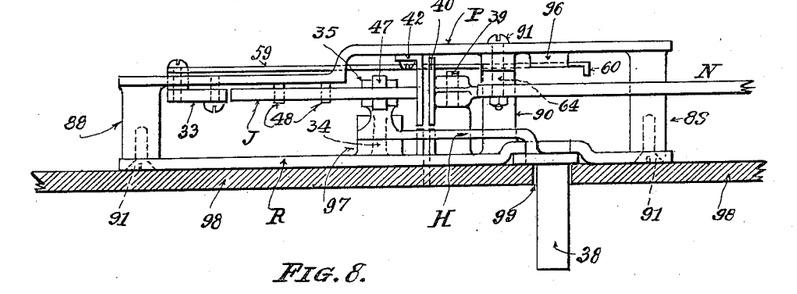
Fig. 8 is a plan of part of the mechanism by which the graduated scale beams are locked and unlocked.

The front plate R, and with it all the mechanism located in the frame are properly secured to the front wall 98 of the head D in any approved manner, there being in said front wall 98 a curved slot 99, Figs. 1 and 8, for the passage of the pull 38, and an escutcheon plate 100, Fig. 1 for the coin slot 41. There is also on the back of the front plate R a short section 102, Figs. 6 and 7, of a coin chute that connects with the coin slot 41 to direct a coin to the latter slot.

In the foregoing specification, and in some of the subjoined claims, I am employing the term "locking mechanism" to designate means which support the weighing scale beams in elevated position to render the weighing scale beams inoperative. While it is true that the weighing scale beam supporting mechanism is not in the true sense of the term locking mechanism, it is, nevertheless, mechanism that prevents the operation of the weighing scale beams, and as such performs the function of a true locking under the described conditions, so that I desire it to be understood, that where not inconsistent with specific elements recited in such claims which relate to the supporting function, positive locking mechanism would be the mechanical equivalent of the supporting mechanism, and as such within the scope of my invention.

I have heretofore described with considerable minuteness the preferred embodiment of my invention, but I desire it to be understood that I am aware that many of the details of construction may be changed, and parts omitted without departing from the scope of my invention as determined by the subjoined claims.

Having thus fully described my invention, I claim as new, and desire to secure to myself by Letters Patent of the United States—

1. In a coin controlled weighing machine, the combination, of a base, a platform thereon, a column secured to said base, a head on said column, a weighing beam in said head, said weighing beam having knife-edged fulcra, a vertically movable slide on which said fulcra rest, means constructed to support said slide, a connection between said weighing beam and said platform, graduated scale beams pivotally mounted in said head, a yielding connection between said weighing beam and said graduated scale beams, mechanism in said head constructed to support said graduated scale beams in inoperative position, means for releasing said supporting means when a coin is introduced to the apparatus to render said scale beams operative, and means operated by said slide supporting means to release said scale beams supporting means to again render said scale beams inoperative.

2. In a coin controlled weighing machine, the combination, of a base, a platform thereon, a column secured to said base, a head on said column, a weighing beam in said head, said weighing beam having knife-edged fulcra, a vertically movable slide on which said fulcra rest, a cranked lever constructed to support said movable slide, a tensioned spring connected to said cranked lever, a connection between said weighing beam and said platform, graduated scale beams pivotally mounted in said head, a yielding connection between said weighing beam and said graduated scale beams, mechanism in said head constructed to support said graduated scale beams in inoperative position, and means operable when a coin has been introduced to the apparatus to depress said scale beams supporting means to render the scale beams operative.

3. In a coin controlled weighing machine, the combination, of a base, a platform thereon, a column secured to said base, a head on said column, a weighing beam in said head, said weighing beam having knife-edged fulcra, a vertically movable slide on which said fulcra rest, a cranked lever constructed to support said movable slide, a tensioned spring connected to said cranked lever to resist downward movement of said slide, a connection between said weighing beam and said platform, graduated scale beams pivotally mounted in said head, a spring connection between said weighing beam and said graduated scale beams, mechanism in said head constructed to support said graduated scale beams in inoperative position, means operable when a coin has been introduced to the apparatus to depress said scale beams supporting means to render the scale beams operative, and means operated by said cranked lever for releasing said scale beams supporting means.

4. In a weighing machine, coin-controlled mechanism for locking and releasing the graduated scale beams, said mechanism including a fixed coin slot member, and a second coin slot member, comprising an oscillator, said oscillator being pivotally mounted and constructed to rotate on a fixed stud, a push bar, means for reciprocating said push bar, there being in the fixed coin slot member an opening which said push bar is constructed to enter, a supporting arm, means for supporting said supporting arm in raised position, and means on said oscillator constructed to depress said means for supporting said supporting arm when a coin has been deposited between the fixed and the rotatable coin slot walls and said oscillator is operated.

5. In a weighing machine, coin controlled mechanism for locking and releasing the graduated scale beams, said mechanism including a fixed coin slot plate, an oscillator, said oscillator having a plate forming the second coin slot member, said oscillator being pivotally mounted, and constructed to rotate, on a fixed stud, a push bar, means for reciprocating said push bar, there being in each of said plates an opening which said push bar is constructed to enter, a supporting arm, means for supporting said supporting arm in raised position, means on said oscillator constructed to depress said supporting means, and means for locking said supporting means in depressed position.

6. In a weighing machine, coin controlled mechanism for locking and releasing the graduated scale beams, said mechanism including a fixed coin slot plate, an oscillator, said oscillator having a plate forming the second coin slot member, said oscillator being pivotally mounted, and constructed to rotate, on a fixed stud, a push bar, means for reciprocating said push bar, there being in each of said plates an opening which said push bar is constructed to enter, a supporting arm, means for supporting said supporting arm in raised position, means on said oscillator constructed to depress said supporting means, means for locking said supporting means in depressed condition, and means for releasing said means for locking said supporting means.

7. In a weighing machine, coin controlled mechanism for locking and releasing the graduated scale beams, said mechanism including a fixed coin slot plate, an oscillator, said oscillator having a plate forming the second coin slot member, said oscillator being pivotally mounted, and constructed to rotate, on a fixed stud, a push bar, means for reciprocating said push bar, there being in each of said plates an opening which said push bar is constructed to enter, a supporting arm, means for supporting said supporting arm in elevated position, means on said oscillator constructed to depress said supporting means, means for locking said supporting means in depressed position, means for releasing said locking means, and means for returning said locking means to normal position.

8. In a weighing machine, coin controlled mechanism for locking and releasing the graduated scale beams, including a fixed coin slot plate, an oscillator, said oscillator having a plate forming the second member of the coin slot, said oscillator being pivotally mounted, and constructed to rotate, on a fixed stud, a push bar, means for reciprocating said push bar, there being in each of said plates an opening which said push bar is constructed to enter, a vertically movable slide, a supporting arm, said vertically movable slide being constructed to support said supporting arm in raised position, an arm on said oscillator constructed to engage said vertically movable slide to depress the same when a coin is placed between the coin slot plates and said push bar is forwardly moved, means for locking said movable slide in depressed position, and means for disconnecting said locking means from said movable slide to permit the latter to resume its normal elevated position.

9. In a weighing machine, coin controlled mechanism for locking and releasing the graduated scale beams, including a fixed coin slot plate, an oscillator, said oscillator having a plate forming the second coin slot member, said oscillator being pivotally mounted, and constructed to rotate on a fixed stud, a push bar, means for reciprocating said push bar, there being in each of said plates an aperture which said push bar is constructed to enter, a bell crank lever operatively connected to said push bar to move the same in forward direction, means on said push bar for returning said push bar to normal position, and means on said push bar constructed to prevent the return of said push bar until the complete forward movement thereof has been executed.

10. In a weighing machine, coin controlled mechanism for locking and releasing the graduated scale beams, including a fixed coin slot plate, an oscillator, said oscillator having a plate forming a second coin slot member, said oscillator being pivotally mounted, and constructed to rotate on a fixed stud, a push bar, means for reciprocating said push bar, there being in each of said plates an aperture which said push bar is constructed to enter, a bell crank lever operatively connected to said push bar to move the same in forward direction, means on said push bar for returning said push bar to normal position, and means on said push bar constructed to prevent the return of said push bar until the complete forward movement thereof has been executed, said latter means including a ratchet rack on the marginal edge of said push bar, a pivoted dog normally in disengagement with said ratchet rack, and a spring for retaining said dog in normal position, whereby the forward movement of said push bar causes the pivoted dog to rotate to an inclined position, in which position said dog functions as a brace to prevent said return movement.

11. In a weighing machine, coin controlled mechanism for locking and releasing the graduated scale beams, including a vertically movable weighing beam, a supporting arm, an oscillator, said oscillator having a long arm, a vertically movable slide under said supporting arm, the long arm of said oscillator being constructed to depress said vertically movable slide when moved in one direction, a depending, pivoted dog constructed to engage said slide when in depressed position, and means for disengaging said dog from said slide, the latter means being operated by the downward movement of said weighing beam.

12. In a weighing machine, coin controlled mechanism for locking and releasing the graduated scale beams, including a vertically movable weighing beam, a supporting arm, an oscillator, said oscillator having a long arm, a vertically movable slide under said supporting arm, the long arm of said oscillator being constructed to depress said vertically movable slide when moved in one direction, a depending, pivoted dog adjacent said movable slide, constructed to engage said slide when in depressed condition, and means for disengaging said dog from said slide, the latter means being operable when said weighing beam moves in either an upward or a downward direction.

13. In a weighing machine, coin controlled mechanism for locking and releasing the graduated scale beams, including a vertically movable weighing beam, a supporting arm, a vertically movable slide under said supporting arm, an oscillator having an arm constructed to depress said vertically movable slide when moved in one direction, a depending dog adjacent said movable slide constructed to engage said slide when in depressed position, and means for disengaging said dog from said slide, said means including an oscillating ratchet, a depending arm, said arm having a V-shaped nose constructed to engage said ratchet, and a rod connecting said depending arm to said depending dog, whereby rotative movement of said ratchet in either direction will cause oscillatory movement of said depending arm and a disengaging movement of said depending dog.

14. In a coin controlled weighing scales, the combination, of a weighing scale beam, mechanism for supporting said weighing scale beam in inoperative position, said mechanism including a vertically movable slide, a spring for supporting said slide in elevated position, an oscillating dog constructed to lock said slide in depressed position, and means for releasing said dog, said means including a beam, a slide supporting said beam at one end, a lever constructed to support said last-named slide in elevated position, a spring connected to said lever to resist downward movement of said second slide, said weighing beam being downwardly moved when weight is placed in the scale platform, mechanism connected to said spring-actuated lever and said oscillating dog, to oscillate said dog whenever said weighing beam makes either a downward movement, or an upward movement after having been downwardly moved.

15. In a coin controlled weighing scales, the combination, of a weighing scale beam, mechanism for supporting said weighing scale beam in inoperative position, said mechanism including a vertically movable slide, a spring for supporting said slide in elevated position, an oscillating dog constructed to lock said slide in depressed position, means for releasing said dog, said means including a beam, a slide supporting said beam at one end, a lever constructed to support said last-named slide in elevated position, a spring connected to said lever to resist downward movement of said second slide, said weighing beam being downwardly moved when weight is placed on the scale platform, mechanism connected to said spring-actuated lever and said oscillating dog, to oscillate said dog whenever said weighing lever makes either a downward movement, or an upward movement after having been downwardly moved, said latter mechanism including a depending arm, a ratchet connected to said spring-actuated lever, and a rod connecting said depending arm to said oscillating dog.

In testimony that I claim the foregoing as my invention, I have hereunto set my hand.

MATHIAS J. WEBER.

Copies of this patent may be obtained for five cents each, by addressing the "Commissioner of Patents, Washington, D. C."